(12) United States Patent
Debeneix et al.

(10) Patent No.: US 6,679,679 B1
(45) Date of Patent: Jan. 20, 2004

(54) INTERNAL STATOR SHROUD

(75) Inventors: Pierre Emmanuel Etienne Debeneix, Saint-Sauveur S/Ecole (FR); Philippe Roger Fernand Guerout, Le Chatelet en Brie (FR); Olivier Louis Fernand Huppe, Savigny le Temple (FR); Gilles Gérard Claude Lepretre, Epinay sous Senart (FR); Olivier Jean-Jacques Louaisil, Perthes en Gatinais (FR); Thierry Jean-Maurice Niclot, Savigny sur Orge (FR)

(73) Assignee: SNECMA Moteurs, Paris (FR)

( * ) Notice: Subject to any disclaimer, the term of this patent is extended or adjusted under 35 U.S.C. 154(b) by 50 days.

(21) Appl. No.: 09/993,602

(22) Filed: Nov. 27, 2001

(30) Foreign Application Priority Data

Nov. 30, 2000 (FR) .............................. 00 15475

(51) Int. Cl.⁷ ................................................ F01D 9/04
(52) U.S. Cl. ..................................... 415/139; 415/173.1
(58) Field of Search ................................ 415/134, 136, 415/138, 139, 173.1, 209.2

(56) References Cited

U.S. PATENT DOCUMENTS

| | | | | |
|---|---|---|---|---|
| 2,858,104 A | | 10/1958 | Kelk et al. | |
| 3,532,437 A | * | 10/1970 | Strub | 415/136 |
| 4,337,016 A | * | 6/1982 | Chaplin | 415/138 X |
| 4,687,413 A | | 8/1987 | Prario | |
| 5,079,915 A | * | 1/1992 | Veau | 60/766 |
| 5,318,402 A | * | 6/1994 | Bailey et al. | 415/139 |
| 5,320,484 A | | 6/1994 | Charbonnel et al. | |
| 5,320,486 A | * | 6/1994 | Walker et al. | 415/139 |
| 5,320,487 A | | 6/1994 | Walker et al. | |
| 5,593,276 A | | 1/1997 | Proctor et al. | |
| 5,616,003 A | | 4/1997 | Charbonnel et al. | |

FOREIGN PATENT DOCUMENTS

| | | |
|---|---|---|
| FR | 2 580 033 | 10/1986 |
| GB | 856 599 | 12/1960 |
| GB | 2 019 954 | 11/1979 |

* cited by examiner

*Primary Examiner*—Edward K. Look
*Assistant Examiner*—Richard A. Edgar
(74) *Attorney, Agent, or Firm*—Oblon, Spivak, McClelland, Maier & Neustadt, P.C.

(57) ABSTRACT

The stator shroud is made up of components (2) juxtaposed so as to form circumferences, which are successive and assembled separately to a common housing which surrounds them. Characteristically, the assembly is made with only one single fixing point (7) per component (2), while being completed by a support point (21) sliding along the circumference. The result is a more flexible component assembly and a more even distortion, which allows better control of the clearances between the shroud and the rotor blades it surrounds.

14 Claims, 6 Drawing Sheets

INTERNAL STATOR SHROUD

The subject of this invention is an internal stator shroud.

Controlling thermal expansion has become essential in the field of turbojet engines in order to ensure high efficiency through regulation of the clearance between the stator and the moveable rotor blade ends. A frequently encountered stator structure is a dual one and includes a housing surrounding an internal shroud in contact with the propulsion gases of the machine. It is common in such a case for the external housing to be formed all in one piece so that it has good mechanical resistance and may be cooled by ventilation with a high level of consistency helped by its continuity, but for the shroud on the other hand to be composite, formed of successive component circumferences in a circle sector. By means of this arrangement, the internal stresses, which might have developed in the shroud from its being joined to the more rigid housing and from exposure to the hot gases in the vein, remain at a moderate level, and the different circumferences may be ventilated at different intensities in order to regulate their diameters independently. The prior art includes a certain number of examples of this dual stator, among which may be cited French patents 2 683 851 and 2 695 164 issued to the applicant.

Figure 1:
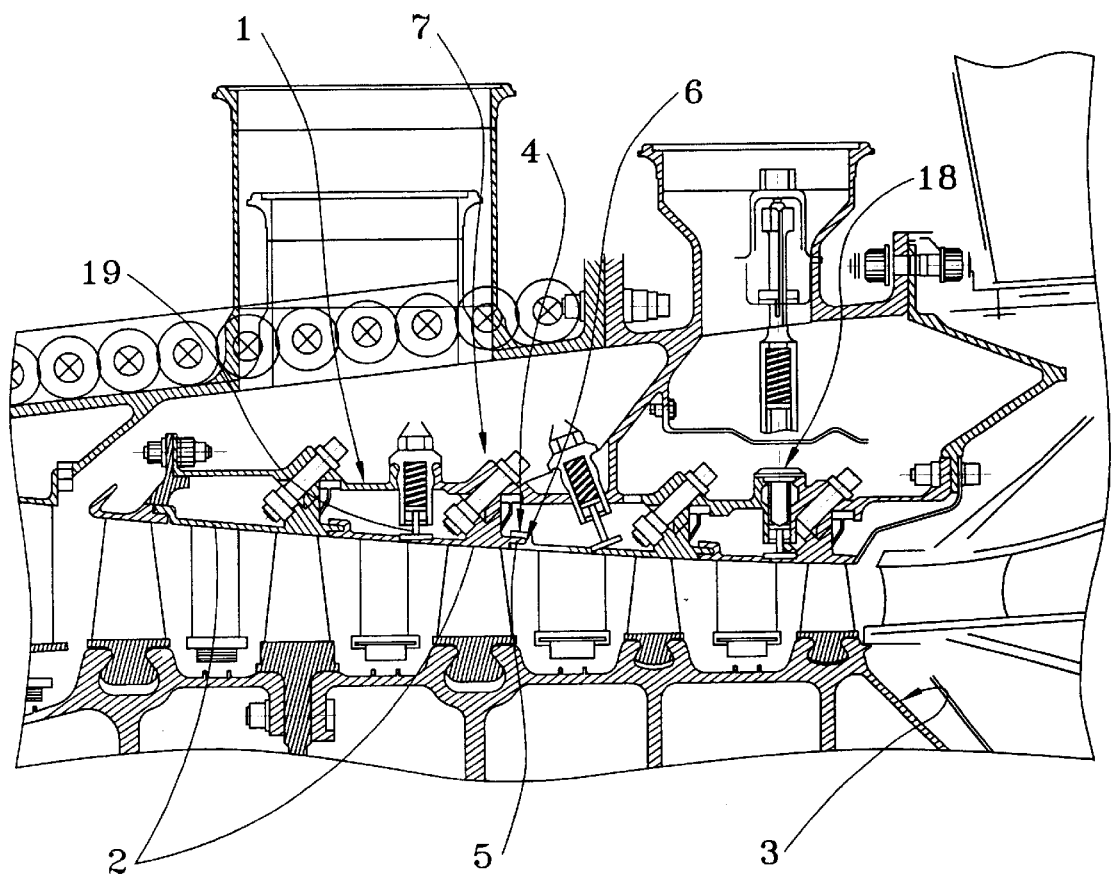

FIG. 1 shows one of these designs, wherein the external housing is denoted 1, the shroud components are denoted 2 and the rotor is denoted 3; the shroud components 2 are joined to the adjacent components 2, located on the adjoining circumferences, by joints 4 composed of a tenon 5 on one of the components 2 and a groove 6, into which the tenon 5 penetrates, on the other of the components 2. Fixing points 7, better shown in FIG. 2, connect the shroud components 2 to the housing 1. They include essentially a bolt 8 engaged through a boss 9 of the housing 1 and a housing 1 contact bearing 10, located at the end of a rib 11 of the shroud component 2. The bolts 8 are in general placed obliquely in order to provide the axial and radial holding of the rectifier sectors (the shroud components 2). Circular resilient joints 12 are placed at the back of the circumferences of the shroud components 2 and include a heel 13 held tightly between the contact bearing 10 and a shoulder 14 of the housing 1 and, rising under the heel 13, a sealing lip 15 the end of which is supported on a plane sealing face 16 at the back of the shroud components 2. In this way, individual chambers 17 are isolated between the housing 1 and each of the shroud component circumferences 2.

The objective of obtaining good regulation of the diameters of the shroud circumferences is however not fully met, since variations in diameter and rippling of the circumferences can easily occur.

This drawback is attributed here to the presence of the fixing points 7, which seem like structural irregularities in the shroud components 2. More exactly, the inventors have considered that the presence of a plurality of fixing points 7 was harmful and propose using only one of them per shroud component 2.

Since a single fixing point would not by itself allow a shroud component to be held in a satisfactory way, it is further advocated to use a single support point per shroud component 2 in place of the eliminated fixing points. This support point includes a tenon fixed to the shroud component and penetrating into a groove of an associated flange, which is fixed to the housing. The shroud components have the ability to be displaced slightly in the axial and circumferential directions of the machine at the support point by a sliding of the tenons in the grooves, without excessive displacements being tolerated since stop states would be reached. In this way is achieved a suitable joint of the shroud components to the housing and a flexibility of assembly which prevents them being distorted unevenly.

Figure 2:
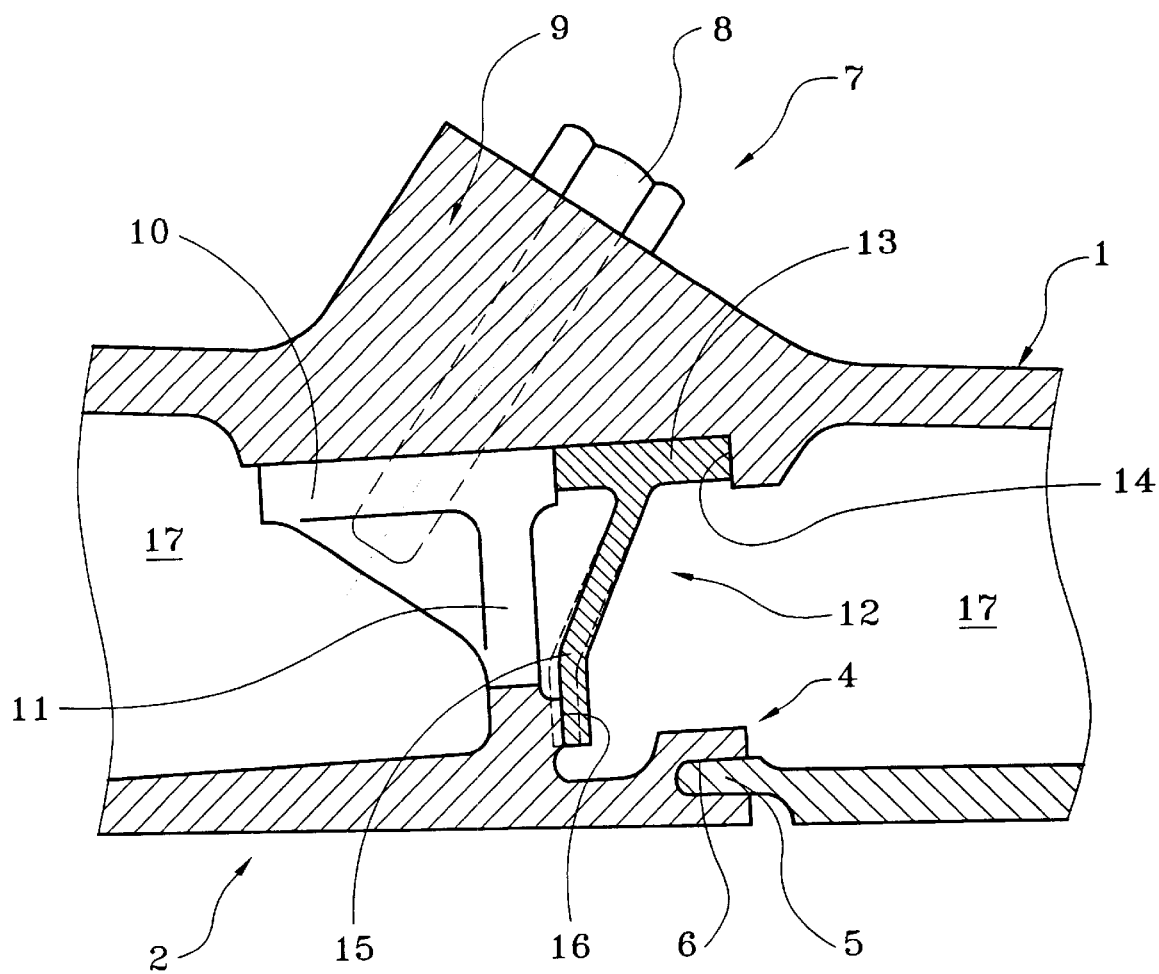
Figure 3:
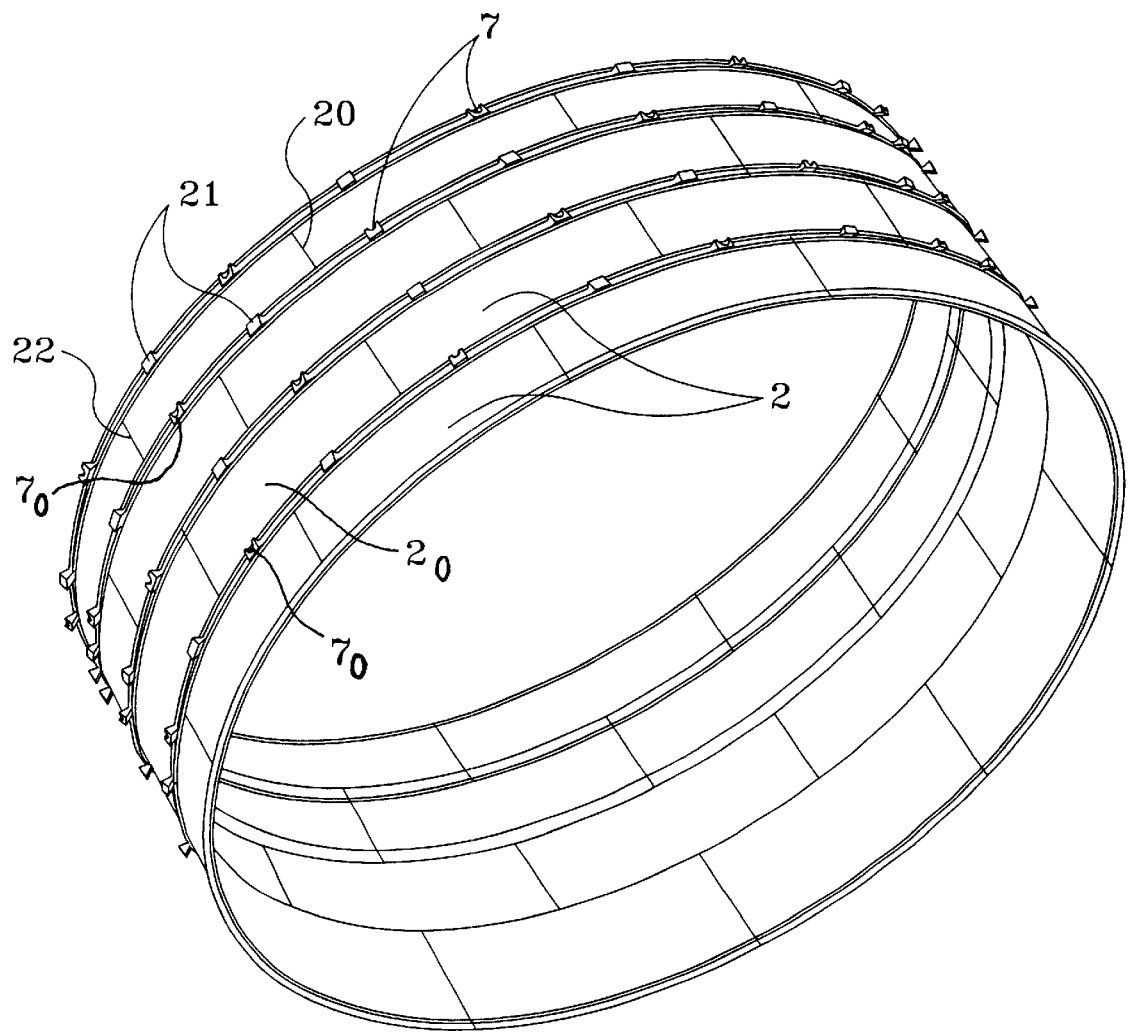
Figure 4:
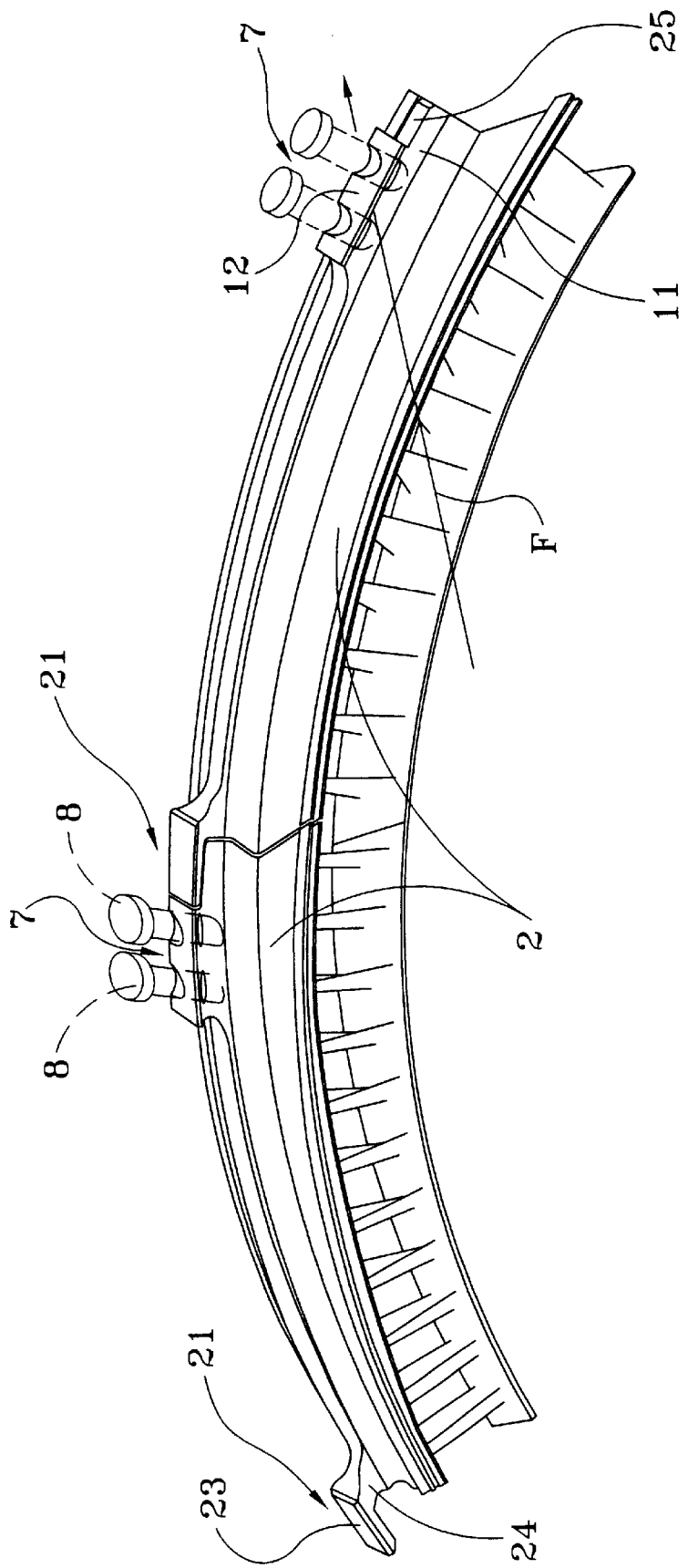

Other characteristics and advantages of the invention will now be described with reference to the following figures:

FIG. 1 already described shows a composite stator,

FIG. 2 already described shows a shroud component fixing point to a housing, and the other FIGS. 3 to 6 show some embodiments of the invention: FIG. 3, a first embodiment; FIG. 4, a shroud component of the latter; and FIGS. 5 and 6, essential details of two other embodiments.

Many prior art components already mentioned in relation to FIGS. 1 and 2 are found again in the invention. This is particularly true of the structure of the fixing points 7 and the presence of the connection components 4 between shroud circumferences and of the resilient joints 10 for damping vibrations. A characteristic feature of the invention is that each shroud component 2 is associated with only a single fixing point 7 which is located near a lateral end 20 (and not far from an axial edge of the shroud component 2). A support point 21 is also placed on each shroud component 2 symmetrically to the fixing point 7, near the same axial edge and not far from the opposite lateral end 22. A notable lesson to be drawn from FIG. 3 is also that it is advantageous for the shroud components 2 to be located in staggered rows, in other words for their ends 20 or 22 to be in the extension of centre lines of the shroud components 2 of the adjacent circumferences. By adopting this arrangement, a shroud with a coherent structure, despite the small number of fixing 7 and support 21 points of its components, is obtained. It may be explained by indicating that each shroud component (such as the component denoted $2_0$) is surrounded by two components belonging to adjacent circumferences and the fixing points of which (denoted $7_0$) extend approximately half way along the length of the component $2_0$. These fixing points $7_0$ also restrict the radial distortions of the component $2_0$ by means of the tenon 5 and mortise 6 couplings between the shroud component circumferences 2. This advantage is even more noticeable if the fixing 7 and support 21 points are right at the ends of the shroud components 2, which is advantageous since they may then engage with each other, since the fixing points $7_0$ of the adjacent components are indeed half way along the length of the component $2_0$, at the point where it would have been the least supported without them.

If the structure is sufficiently rigid against radial distortions, it is on the contrary very flexible along axial distortions and in conference thanks to the sliding nature of the support points 21, which allows said distortions within certain limits. There is therefore good reconciliation of the needs to allow the shroud to distort in accordance with thermal solicitations while retaining a round shape of not very variable diameter.

FIG. 4 shows that the support points 21 include a tenon 23 located at the end of a shaft 24 rising from the shroud component 2. This tenon 23 rests on the bottom surface of a groove 25 integral with the housing 1. In this embodiment wherein the fixing and support points 7 and 21 are near the lateral ends 20 and 22 of the shroud components 2, they are adjacent to those of the adjoining shroud components 2, in such a way that the groove 25 may here be made in the rib 11 of the fixing point 7 of the adjoining shroud component 2. The tenon 23 extends in the tangential direction of the machine to overlap from the shroud component 2 to which it belongs over the next component. It will be seen that other configurations are possible, but in every case the support points 21 allow moderate mutual axial and circumferential displacements of the adjoining shroud components 2.

Here, as in other embodiments, the fixing points 7 are designed with two parallel bolts 8, which makes no difference to the unity of the fixing point 7 since these bolts 8 are close together. The pair of bolts 8 makes it possible to obtain a more secure fixing and sometimes to eliminate the bending moments exerted by the aerodynamic forces on the shroud components 2: if the resultant F of these forces, or its projection in the radial direction, passes between the bolts 8, the reaction is exerted by comparable stresses produced in them, without the shroud component 2 itself being subject to significant bending.

Figure 5:
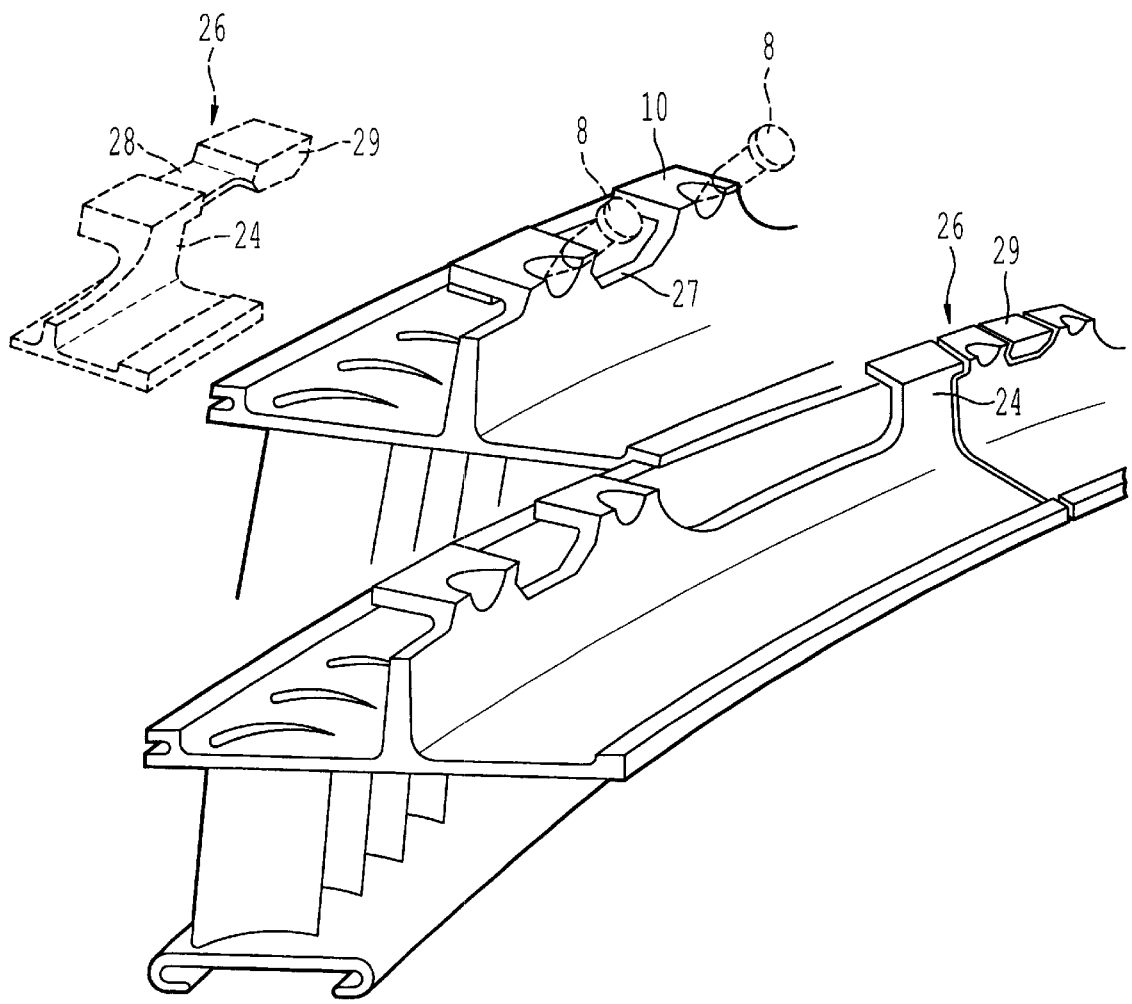

In an embodiment variant shown in FIG. 5, the tenon of the fixing points is of a more complex shape and is denoted 26; it engages in a groove 27 made between the locations of the bolts 8 and then includes in succession, after the shaft 24, a tray bar 28 slid under the heel 10 of the fixing point 7 and a larger and particularly wider end 29, so as to project axially and extend between the two portions of the heel 10 into the groove 27, which is provided in the rib 11. Here, the essential portion of the tenon 26 has an axial rather than a tangential extension, which makes no difference to the support conditions.

Figure 6:
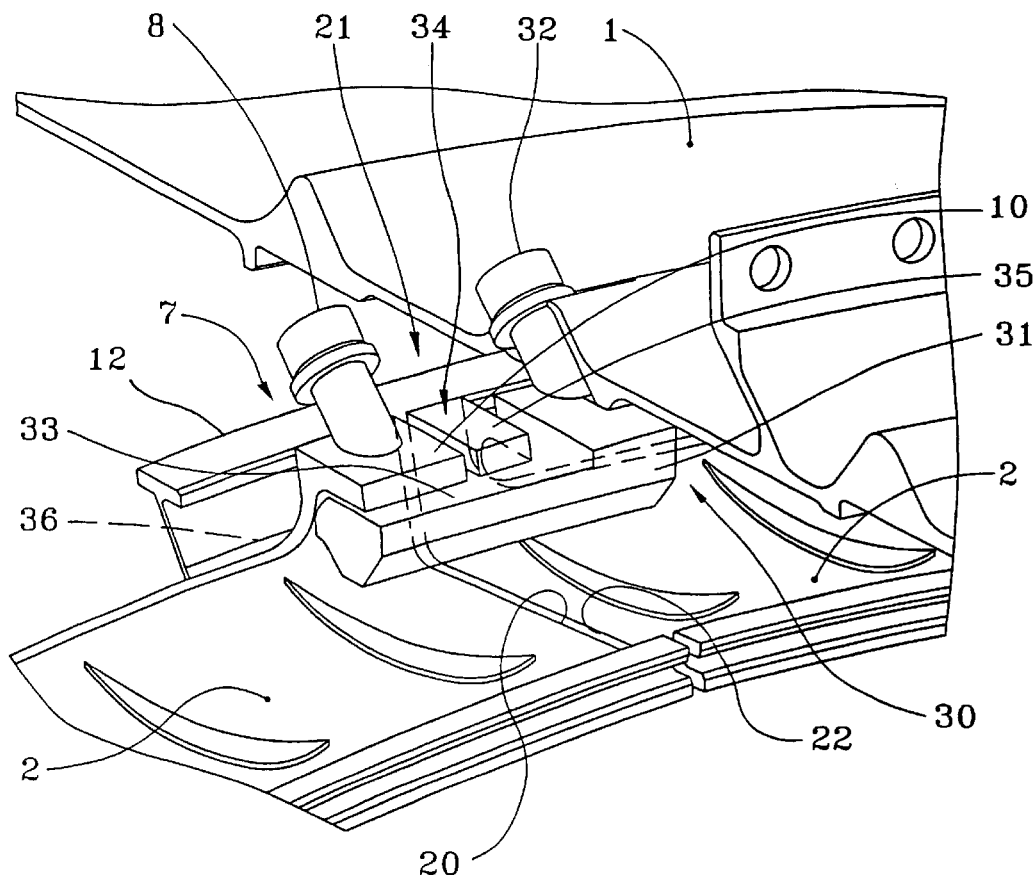

In other embodiments, the flanges on which the notches are set do not belong to the fixing points 7 but to autonomous parts. This is shown in FIG. 6, where the fixing points 7, which here include only a single bolt 8 but remain located near the lateral end 20, no longer have a groove 25 or 27: we then have a flange 30, composed of a bar 31 connected to the housing 1 by a bolt 32 similar and parallel to the bolt 8 and channelled with a groove 33, near the fixing point 7 in such a way that the heel 10 overhangs the end of the bar 31 and closes the groove 33. The support point 21 of the shroud component 2 further includes a tenon 34 with an end 35 projecting axially in the groove 33 in order to make the desired connection. The end 35 is connected to the main body of the shroud component 2 adjoining the one which carries the fixing point 7 by a shaft 36 adjacent to the lateral end 22 and of radial direction.

In these different embodiments, it will have been noticed that the support 21 and fixing 7 points belonging to consecutive shroud components 2 on a circumference engage with each other, in other words that the fixing point 7 offers at least one stop or support surface to the tenon of the support point 21: in the embodiment in FIG. 4, the tenon 23 is supported radially in the groove. 25 and stops tangentially against the contact bearing 10 or the rib 11 of the fixing point 7; in the embodiment in FIG. 5, the tenon 26 stops tangentially against the contact bearings 10 which surround them and is supported radially on the groove 27; and in the embodiment in FIG. 6, the tenon 35 stops tangentially on the contact bearing 10 and the bar 31, and is supported radially on the bottom of the groove 33. This engagement of the fixing 7 and support 21 points simplifies the structure making it possible not to have recourse to flanges of complex shape in order to provide the sliding of the support point tenons at the same time as limiting it.

It is desirable also to allow moderate displacements of the shroud components in an axial direction at the support points 21. The stops may be provided either by the lateral faces of a sliding groove such as 25, or by the very structure of the fixing point 7, for example the rib 11 in the solution in FIG. 5, or by an autonomous flange or bar portion as in the solution in FIG. 6; the resilient joints 12 may also act as a stop, as can be clearly seen in this same FIG. 6.

The proximity of the support 21 and fixing 7 points of adjacent shroud components 2 may possibly allow the support point 21 to be held at a good position in the radial direction without an additional part being used, as is the case in FIG. 4 where the tenon 23 of the support point 21 is in radial support in the groove 25 adjacent to the fixing point 7 and channelled in the adjoining shroud component 2.

What is claimed is:

1. An internal stator shroud composed of shroud components in the form of circle sectors joined in a plurality of successive circumferences to an external housing only at a first circumferential end and radially supported only at a second circumferential end opposite to the first end by a support arrangement, including a tenon fixed to the shroud component and penetrating in a groove of an associated flange fixed to the housing.

2. An internal stator shroud according to claim 1, characterised in that the flanges are formed, for each of the tenons, in a shroud component adjacent to the shroud component carrying said tenon.

3. An internal stator shroud according to claim 1, characterised in that the flanges are distinct from the shroud components and bolted to the external housing.

4. An internal stator shroud according to claim 3, characterised in that the shroud components are placed in a way to close one end of the grooves.

5. An internal stator shroud according to claim 3, characterised in that the shroud components are bolted to the external housing by a pair of parallel fixing bolts, and in that the grooves extend between the bolts of the pairs.

6. An internal stator shroud according to the claim 5, characterised in that the parallel fixing bolts are placed on the shroud components in such a way that a resultant force of aerodynamic stresses on said components passes between the fixing bolts.

7. An internal stator shroud according to any one of the previous claims, characterised in that the shroud components are assembled from one circumference to a next circumference in staggered rows.

8. An internal stator shroud composed of shroud components in the form of circle sectors joined in a plurality of successive circumferences, each of said shroud components being fixed to an external housing only at a first circumferential end, and radially supported only at a second circumferential end opposite to the first end by a support arrangement including a tenon fixed to the shroud component and penetrating in a groove of an associated flange fixed to the housing.

9. An internal stator shroud according to claim 8, characterised in that the flanges are formed, for each of the tenons, in a shroud component adjacent to the shroud component carrying said tenon.

10. An internal stator shroud according to claim 8, characterised in that the flanges are distinct from the shroud components and fixed to the external housing.

11. An internal stator shroud according to claim 10, characterised in that the shroud components are placed in a way to close one end of the grooves.

12. An internal stator shroud according to claim 10, characterised in that the shroud components are fixed to the external housing by a pair of parallel fixing bolts, and in that the grooves extend between the bolts of the pairs.

13. An internal stator shroud according to claim 12, characterised in that the parallel fixing bolts are placed on the shroud components in such a way that a resultant force of aerodynamic stresses on said components passes between said fixing bolts.

14. An internal stator shroud according to any one of the claims 8–13, characterised in that the shroud components are assembled from one circumference to a next circumference in staggered rows.

* * * * *